United States Patent [19]

Miller

[11] Patent Number: 4,655,365

[45] Date of Patent: Apr. 7, 1987

[54] HATCH COVER LOCK

[75] Inventor: Roy W. Miller, Highland, Ind.

[73] Assignee: Pullman, Inc., Chicago, Ill.

[21] Appl. No.: 679,287

[22] Filed: Dec. 7, 1984

[51] Int. Cl.[4] .................. B65D 43/16; B65D 45/28; E05B 65/18

[52] U.S. Cl. .................. 220/314; 105/377; 220/335; 292/256.5; 292/DIG. 49; 16/319; 16/374

[58] Field of Search .......... 105/377; 292/113, 247, 292/256.5, DIG. 49; 16/319, 347, 363, 374; 220/314, 322, 324, 335

[56] References Cited

U.S. PATENT DOCUMENTS

| | | | |
|---|---|---|---|
| 2,074,464 | 3/1937 | Dwyer | 16/347 X |
| 2,324,356 | 7/1943 | Brown | 105/377 |
| 2,647,473 | 8/1953 | Lunde | 105/377 |
| 2,837,040 | 6/1958 | Johansson | 105/377 |
| 3,228,353 | 1/1966 | Carney, Jr. | 105/377 |
| 3,266,440 | 8/1966 | Price et al. | 105/377 |
| 3,628,817 | 12/1971 | Sheahan et al. | 292/247 |
| 3,647,251 | 3/1972 | Brown et al. | 292/341.18 |
| 3,934,518 | 1/1976 | Adler | 105/377 |
| 4,000,703 | 1/1977 | Halliar | 105/377 |
| 4,365,832 | 12/1982 | Treppler | 292/356.5 |
| 4,388,873 | 6/1983 | Carleton et al. | 105/377 |
| 4,441,431 | 4/1984 | Carney, Jr. et al. | 105/377 |
| 4,461,219 | 7/1984 | Bateson | 105/377 |

FOREIGN PATENT DOCUMENTS 1301036  7/1962  France ............. 292/256.5

Primary Examiner—David A. Scherbel
Assistant Examiner—David F. Hubbuch
Attorney, Agent, or Firm—Richard J. Myers & Assoc.

[57] ABSTRACT

A railway hopper car has a hatch opening defined by its upper deck surface. A hatch cover is adapted to close the hatch opening. A hinge arrangement is connected with the upper deck surface and a locking arm extends from the hinge arrangement and across the hatch cover, being connected to the hatch cover. The hinge arrangement has a stop thereon which supports the hatch cover when it is pivoted open. The locking arm has a hatch engagement portion on the end opposite the hinge arrangement which is engaged by a latch structure connected with the upper deck surface. The latch structure includes a pivoting latch holder and latch which may be engaged with the latch engagement portion and rotated in one direction to seal the hatch cover and rotated in the opposite direction to unseal the cover. When the latch is rotated to unseal the cover, any excess pressure in the car causing the hatch cover to rise will rotate the latch holder into an extended position where the hatch cover is retained loosely over the hatch opening, and the pressure is allowed to escape. The link has a pivotal connection with the coaming bracket to provide for complete disengagement of the cover from the hatch. The pivotal connection is eccentrically mounted in a cylindrical adjustment member secured by a set screw. Selective rotation of the cylindrical member adjusts the tightness of the hatch cover seal over the hatch opening.

23 Claims, 13 Drawing Figures

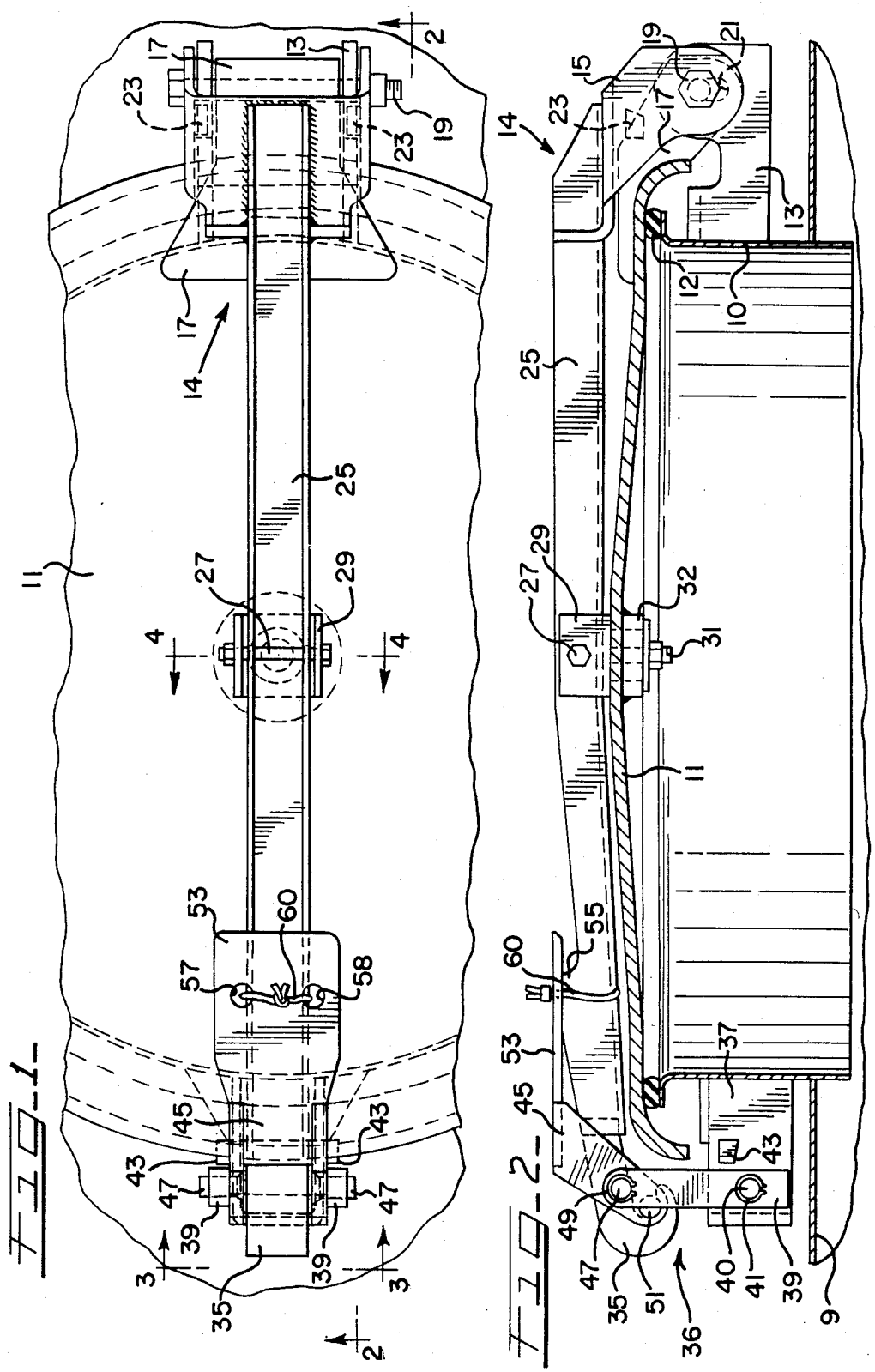

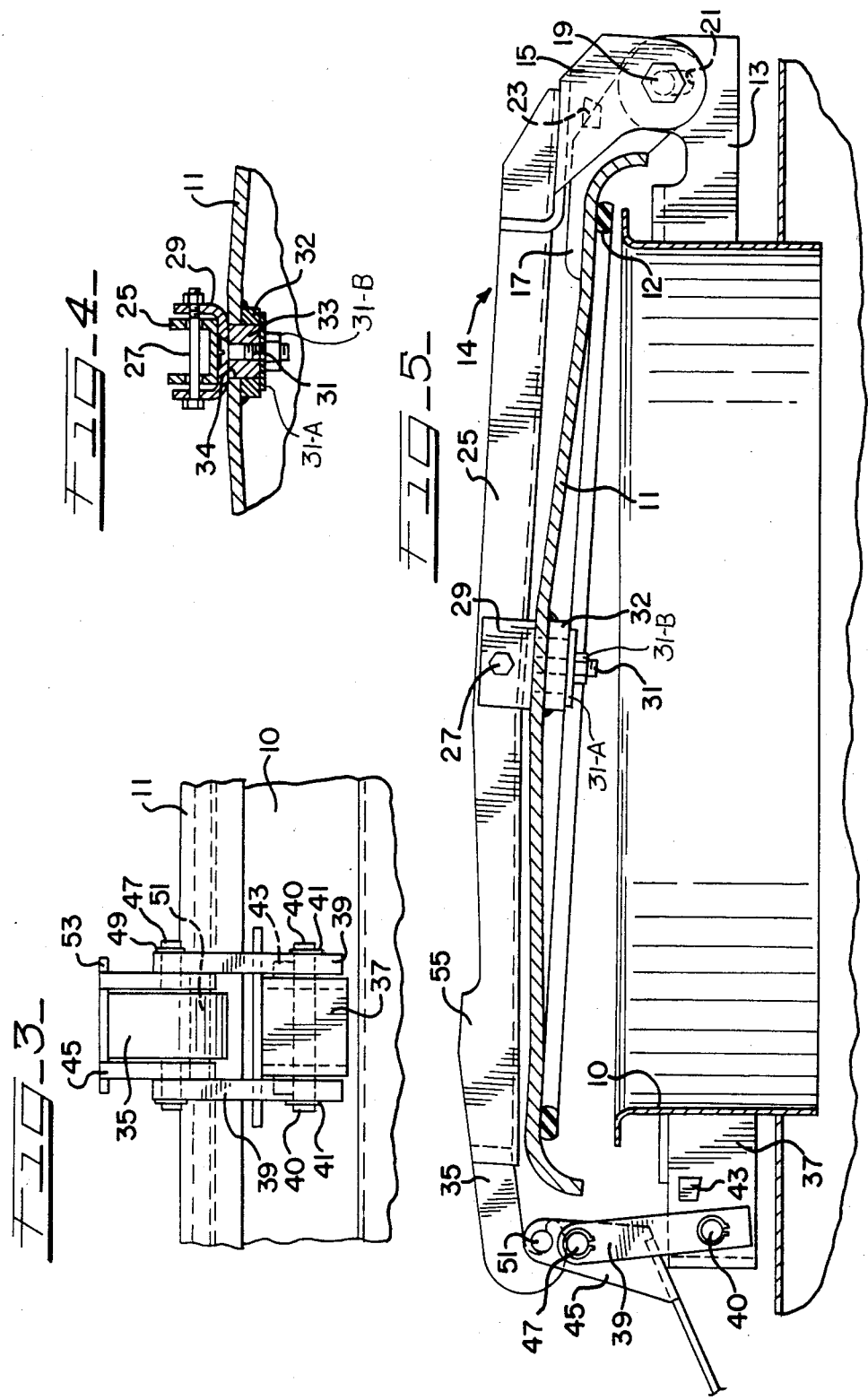

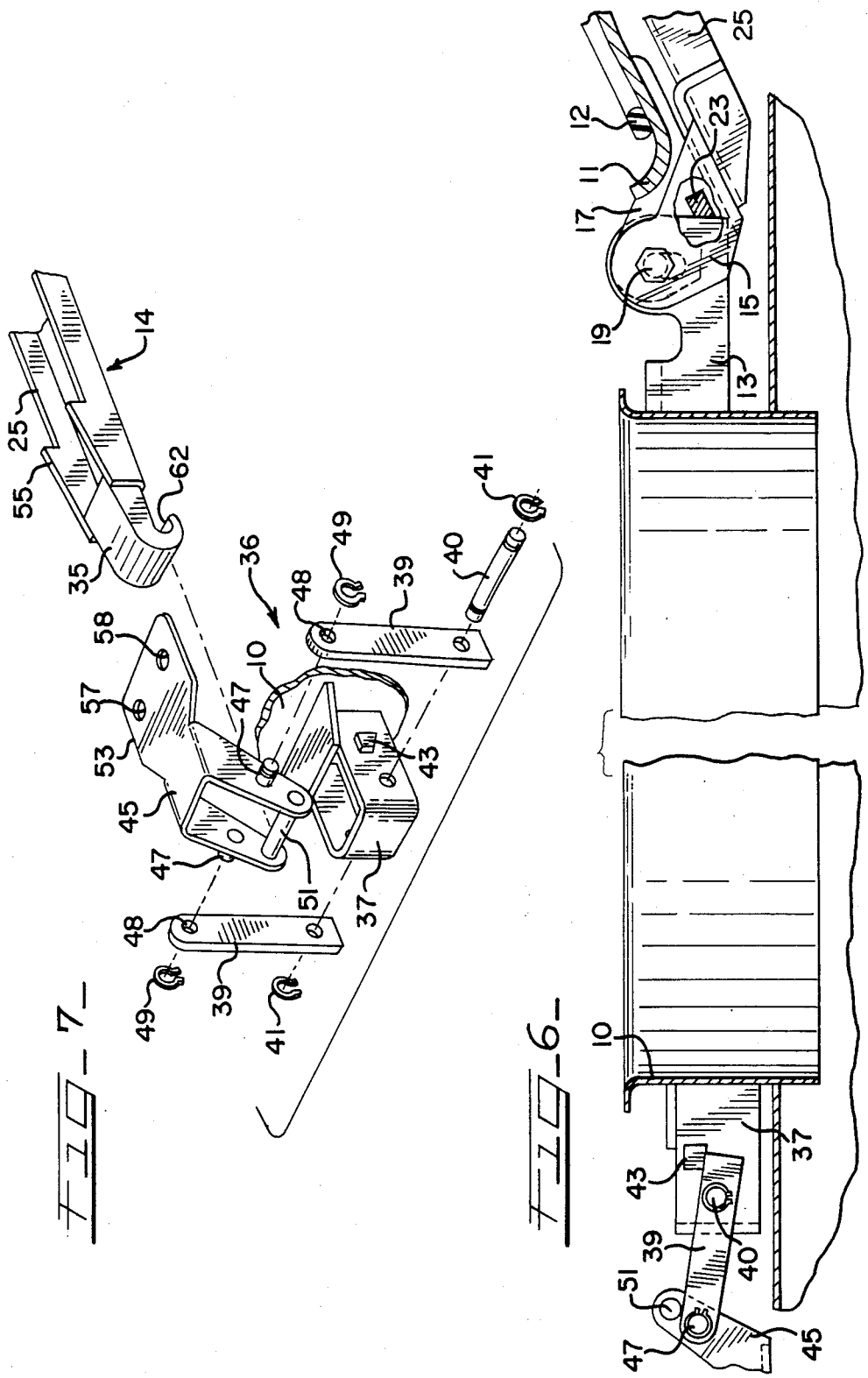

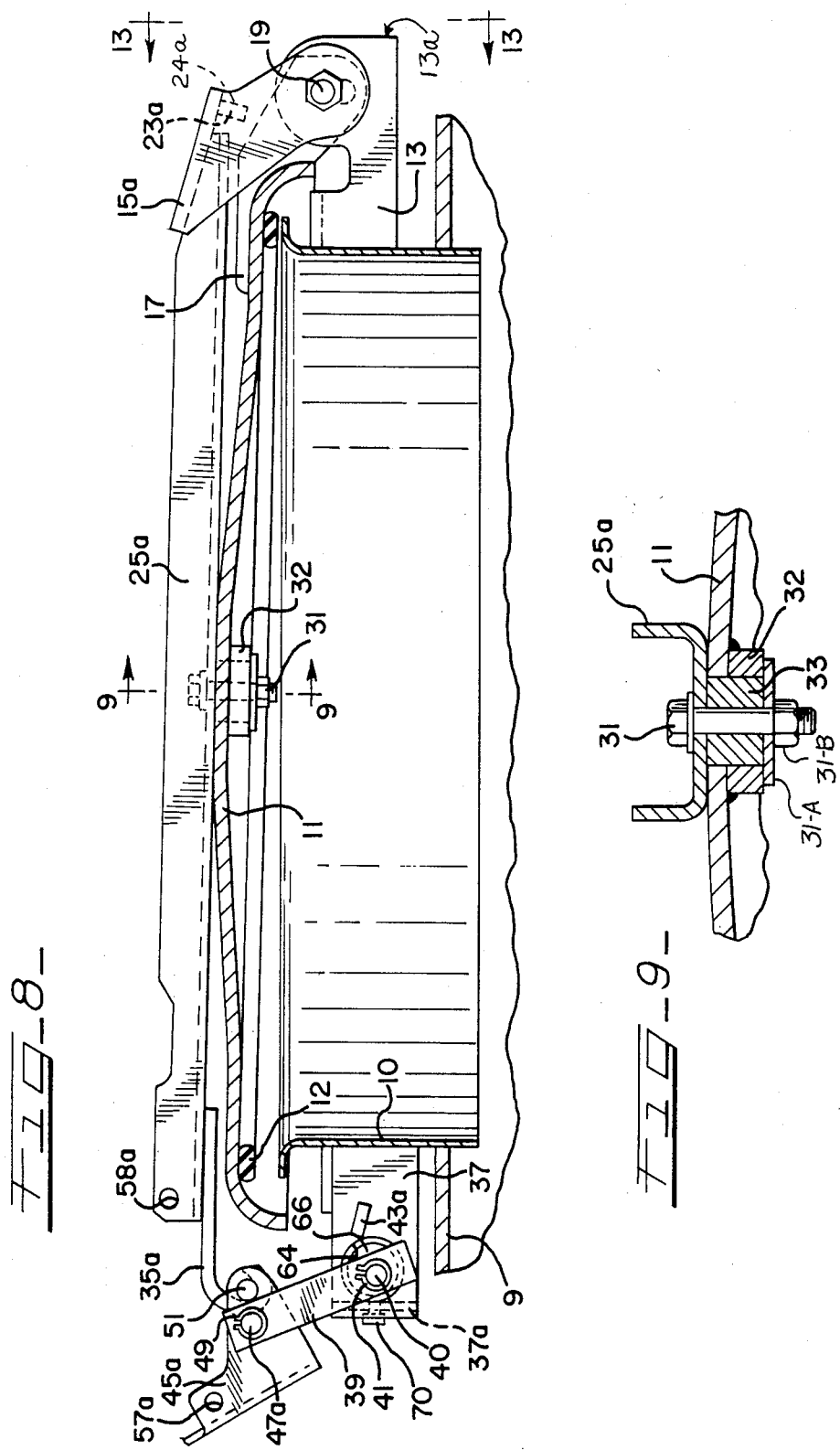

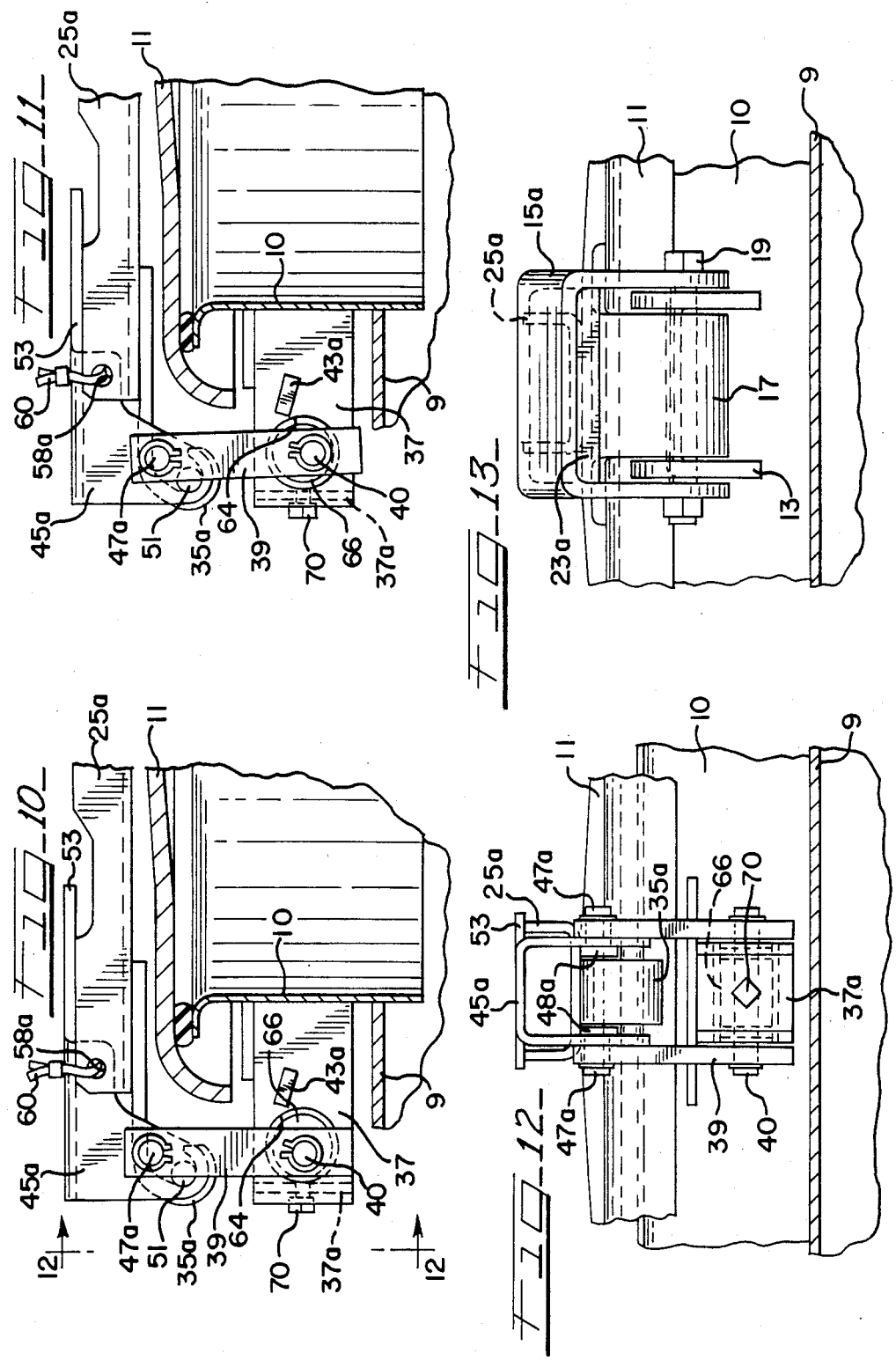

HATCH COVER LOCK

BACKGROUND OF THE INVENTION

1. Field of the Invention

This invention relates to hatch covers for cargo carrying vessels such as the hopper of a railway covered hopper car and latch structures for such hatch covers.

2. Description of the Prior Art

Locking arrangements for lockingly sealing a hatch cover to a hatch opening or a coaming of a vessel such as a lading hopper of a railway covered hopper car are old and well known. The lading in a given vessel may have properties such that excess pressure built up inside the vessel when the hatch is sealed. When the locking arrangement is released the excess pressure may swing the hatch cover open with considerable force endangering human operators and potentially damaging the apparatus. To prevent this, the locking arrangement may be designed to retain the hatch cover in an intermediate "blow-off" position where the hatch cover is free to move enough to vent pressure but restrained against larger movement.

U.S. Pat. Nos. 4,157,146; 4,388,873; and 4,441,431 disclose various arrangements for sealing a hatch cover and retaining it in a blow-off position. U.S. Pat. No. 4,157,146 discloses a plurality of clamps mounted about the hatch circumference or perimeter requiring a plurality of repeated operator functions to open the hatch. U.S. Pat. Nos. 4,388,873 and 4,441,431 each disclose a hatch cover securable by a cam lock in both sealed and blow-off positions but the latch structure is relatively weak and in the event of a mechanical failure the hatch cover might blow open. An additional problem is encountered when human operators use hammers to disengage latch structures of the disclosed configuration by hammering the cam lock to a blow-off position and then hammering it to a disengaged position, risking damage to the latching arrangement.

SUMMARY OF THE INVENTION

It is an object of this invention to provide a hatch cover lock which is selectively engageable with a hatch cover in three positions: the first being a tightly sealed position; the second an unsealed intermediate or pressure blow-off position; and the third being the fully disengaged or wide open position.

It is further an object of this invention to provide a hatch cover lock design which prevents a human operator from unsealing and opening the hatch cover using a blunt object such as a hammer.

It is an object of this invention to provide a hinge design for a hatch cover structure which supports the hatch cover in its widest open position without contact to the upper deck surface of the railway hopper car.

It is an object of this invention to provide a means for adjusting the sealing pressure of a latch structure on a hatch cover.

It is an object of this invention to provide an improved pilferage-resistant latching structure for a hopper car hatch cover.

It is also an object of this invention to provide a lightweight hatch arrangement which may readily be opened by an operator and which is inexpensive to manufacture.

A hatch cover is held in place by a locking bar passing over and connected to the center of the hatch cover. At one end the locking bar is attached to a hinge mounted on the coaming of the hopper car hatch opening. The hinge has a stop which supports the locking bar and thereby the hatch cover in its wide open position without contact with the deck surface of the railway car.

At the distal end of the locking bar is a latch engagement portion having a hook-shaped latch engagement portion engageable with a latch pivotally mounted on a bracket fixed to the coaming of the hopper car hatch opening. The latching structure is rotatable and has an eccentric latch bar which coacts with the hook-shaped latch engagement portion to seal the hatch cover against the coaming. The latch bar of the latching structure retains contact with the hook-shaped latch engagement portion when the latching structure is unsealed and by rotation of the latching structure moves to a vertically higher position while still retaining the hook-shaped latch engagement portion and the locking bar of the hatch cover. This allows the hatch cover to move upward a relatively small distance and allows excess pressure in the vessel or the hopper car to escape. When the pressure is dissipated, the hatch cover will settle to rest on the top of the coaming and the latching structure may be disengaged from the hook-shaped latch engagement portion altogether. The hatch cover may then be rotated into wide open position where it will be supported by the stops in the hinge design.

Adjustment of the sealing pressure of the hatch cover over the coaming may be accomplished by the rotation of a cylinder which holds the latch pivotally. The rotation of the cylinder changes the vertical position of the latch and the tightness of the seal.

In a low-cost alternate embodiment, most component parts of the locking arrangement may be formed by cutting from channel metal stock, reducing weight, cost of materials and labor necessary to manufacture the locking arrangement.

BRIEF DESCRIPTION OF THE DRAWINGS

FIG. 1 is a partial plan top view of a hatch cover having a locking structure of this invention and in the sealed position.

FIG. 2 is a side section view of FIG. 1 as indicated by the section line 2—2 showing the latch arrangement in the sealed position.

FIG. 3 is a partial section view of FIG. 1 as indicated by the section line 3—3 showing the latch arrangement in the sealed position.

FIG. 4 is a detailed partial section view of FIG. 1 as indicated by section line 4—4.

FIG. 5 is a side section view taken along the section line 2—2 of FIG. 1 showing the latch arrangement in the blow-off position.

FIG. 6 is a section view of a hatch cover arrangement in the wide open position supported by the hinge stop.

FIG. 7 is an exploded view of the latching structure and latch engagement portion of the locking bar.

FIG. 8 is a side section view of an alternate low cost embodiment of the locking structure of this invention in a partially unsealed position.

FIG. 9 is a detailed sectional view of FIG. 8 taken along line 9—9 of FIG. 8.

FIG. 10 is a partial side section view as shown in FIG. 8 showing the locking structure in a security-sealed condition.

FIG. 11 is the view as in FIG. 10 where the sealing pressure adjustment device has been used to tighten the hatch cover seal.

FIG. 12 is an end view taken along line 12—12 in FIG. 10.

FIG. 13 is an end view taken along line 13—13 in FIG. 8.

DETAILED DESCRIPTION OF THE PREFERRED EMBODIMENT

As best shown in FIGS. 1 and 2, a railway hopper car has an upper deck surface or deck means 9 having a hatch ring or annular coaming 10 extending vertically upward and defining a hatch opening in the deck surface 9. This opening is closed by hatch cover 11. A seal is maintained by a hatch cover gasket 12 held between hatch cover 11 and coaming 10.

To allow rotation of the hatch cover 11 away from the coaming 10, a hinge structure is provided wherein a hinge bracket 13 is attached to the coaming 10. A locking arm or bar generally indicated at 14 extends from the hinge bracket 13. A hinge member 15 and a hatch cover brace 17 are pivotally connected to the hinge bracket 13 by pivot pin 19. The hatch cover brace 17 is equipped with slots 21 through which the pivot pin 19 extends and which permit the hatch cover limited movement with respect to the hinge. The hinge member 15 is equipped with hinge stops 23 for supporting the hatch cover when open (better shown in FIG. 6). A locking bar channel portion 25 of locking arm 14 is attached to the hinge member 15 and extends across and above the hatch cover 11 to the opposite side of the coaming 10.

At the approximate center point of the hatch cover 11, the locking bar channel portion 25 is connected by a hatch cover mounting pivot bolt 27 to a hatch cover mount 29. As best shown in FIG. 4, hatch cover mount 29 is connected to the hatch cover 11 by a hatch cover mount bolt 31 engaging hatch cover mounting reinforcements 32 and 33 mounted in a center bore 34 in the hatch cover 11. Bolt 31 is secured to hatch cover 11 by washer 31-A and nut 31-B.

A hook-shaped catch or latch engagement portion 35 extends from the end of the locking bar channel portion 25 distal from the hinge member 15 for engagement with a latching structure generally indicated at 36. The catch 35 includes a mounting portion connected with the locking bar channel portion 25 and extending beyond the periphery of the cover 11. A first portion curves downward from the mounting portion on the locking bar channel portion 25, and a second portion is connected with the first portion, curves generally laterally inward toward the hatch cover 11, and terminates by curving slightly upward.

The latching structure 36 is shown in FIGS. 1, 2, and 5 and in end view in FIG. 3 and in exploded view in FIG. 7. A latch mounting bracket 37 is fixed to the coaming 10. A pair of links 39 are pivotally connected to latch mounting bracket 37 by link mounting pivot pin 40. Link mounting pivot pin 40 is secured by retaining rings 41. Latch stops 43 are mounted on the sides of latch mounting bracket 37.

At the opposite end of links 39, the latch holder 45 is pivotally connected with the links 39. This connection is accomplished by latch holder pivot pins 47 projecting outward from the latch holder 45 and through bores 48 in the links 39. The latch holder pivot pins 47 are secured with retaining rings 49. The latch holder 45 holds a latch pin or latch means 51 which is engageable with the contact surface 62 of the hook-shaped catch 35. The latch holder 45 has a latch handle 53 which eases operator contact and also operates as a rotation limiter for the latch holder 45. The handle 53 abuts a spacer stop portion 55 on the locking bar channel member 25 when the latching structure 36 is in the tightly sealed position as shown in FIG. 2.

For security purposes the handle 53 is equipped with security seal bores or openings 57 and 58 through which security seal means 60 may be passed, engaging the locking bar channel portion 25 to prevent pilferage.

FIG. 8 shows an alternate embodiment of the hatch cover lock arrangement of this invention. Most of the structural components have been designed intending modular fabrication from U-shaped or channel metal stock. This reduces the amount of work required to fabricate the lock arrangement, and also reduces the weight of the structure.

The hinge structure is best shown in FIGS. 8 and 13. The hinge bracket 13 is attached to coaming 10. Channel hinge member 15a is pivotally connected to hinge bracket 13 by pivot pin 19. The channel hinge member 15a is designed to be cut directly from channel stock. A hinge stop bar 23a extends between the inside walls of the channel hinge member 15a. Abutment portion 24a is adapted to abut the hinge bracket 13 at bracket portion 13a to support the hatch cover 11 when it is pivoted away from the coaming 10.

Referring to FIG. 8, channel locking bar portion 25a is attached to channel hinge member 15a and extends across and above the hatch cover 11. The channel locking bar portion 25a is a linearly straight member having a uniform upward facing U-shaped cross section which may be readily cut from channel member stock. At the approximate centerpoint of the hatch cover 11, locking bar portion 25a has a bore or hole in its lower surface through which it is rigidly attached to hatch cover 11 by bolt 31 extending through bore hole 35 in hatch cover 11, as shown in FIG. 9. This design reduces the amount of labor necessary to assemble the hatch cover arrangement.

At the end of the channel locking bar portion 25a distal to the hinge member 15a, a hook-shaped catch 35a is welded to the bottom of channel locking bar portion 25a.

A latching structure engageable with the hook-shaped catch 35a is connected with the coaming 10. Latch mounting bracket 37 is attached to the coaming 10. Bracket 37 has a circular bore or aperture 64 extending through the bracket 37. A cylindrical adjustment member 66 fits rotatably into bore 64 and is secured against rotation by locking means or set screw 70 in a threaded hole in the end wall 37a of the latch mounting bracket 37. Pivot pin 40 extends through an eccentric bore in cylindrical member 66 and pivotally connects links 39 with latch mounting bracket 37. Rectangular latch stops 43a are connected to the sides of latch mounting bracket 37 to stop extreme rotation of the links and prevent the latching structure from striking the upper deck surface 9 when it is disengaged from catch 35a.

As best shown in FIGS. 10, 11, and 12, channel latch holder 45a is pivotally connected to links 39 by pivot pins 47a. The pivot pins 47a extend through bores in links 39 and latch holder 45a and are secured by retaining rings and by enlarged heads 48a.

The latch holder 45a has a handle portion 53. The handle portion 53 abuts the top of the channel locking bar portion 25a when the latch structure is in the sealed position. A portion of the side walls of channel locking bar portion 25a is indented to facilitate an operator's access to the handle 53.

A portion of the latch holder 45a fits between the side walls of channel locking bar portion 25a. In this portion, the latch holder 45a has security bores or openings 57a in its side walls. The locking bar portion 25a also has security bores or openings 58a in its side walls. As best shown in FIGS. 10 and 11, when the latching arrangement is sealed, the latch holder security bores or openings 57a and the locking bar security bores 58a line up and security seal means 60 may be inserted to prevent undetected opening of the hatch lock arrangement.

DESCRIPTION OF OPERATION

The position of the hatch cover 11 relative to the coaming 10 may be essentially one of three positions:
1. tightly closed (FIGS. 1 and 2)
2. partially open in a pressure blow-off position (FIG. 5)
3. wide open (FIG. 6)

To place the hatch cover 11 in a tightly closed position as shown in FIGS. 1 and 2, the hatch cover 11 is allowed to rest against the upper end of coaming 10. The latching structure 36 is maneuvered about pivot pins 40 and 47 to pass the latch pin 51 between the hook-shaped catch 35 and the outer periphery of the hatch cover 11. The latch pin 51 is then placed in contact with catch surface 62 and the latching structure 36 and the catch 62 coact as an over-center lock. The latch holder 45 is rotated to bring the handle 53 into abutment with stop portion 55. Because the latch pin 51 is spaced from the pin 47, the rotation of latch holder 53 first causes a downward movement of the latch pin 51 and the hook-shaped catch 35, which results in a downward force being applied on the hatch cover locking arm 14 and the hatch cover 11. The downward movement continues until latch pin 51 is directly below pivot pin 47, in the dead point, or fully contracted position. Rotation of the latch holder beyond this position to the point where handle 53 abuts the stop portion 55 results a slightly upward final movement of latch pin 51. Further rotation is prevented by handle 53 abutting stop portion 55 and acting as a rotation limiter. The hook-shaped catch is resiliently pressed upward the short distance to the final sealed position of latch pin 51 by the mechanical resilience of the gasket 12, the hatch cover 11, and the rest of the hatch locking structure. This resilience aids in maintaining the hatch cover 11 in the tightly closed position.

Frequently the lading in a hopper car is of a nature to impose an upward or unsealing gas pressure on the underside of the hatch cover 11. These forces may be of sufficient magnitude to cause the hatch cover to be forced to swing completely open when an ordinary locking mechanism is unlatched. Consequently, it is desirable to restrict such movement. To that end in this invention there is a secondary release position or pressure blow-off position for the latching arrangement.

To unseal the hatch cover 11 from the coaming 10 when the latching structure 36 is in the tightly sealed position, the operator rotates the handle 53 away from the spacer stop portion 55 of the locking bar channel portion 25. Initially, because the latch pin 51 is spaced from the pivot pin 47 on the latch holder 45 and because of the relative positions, the rotation of the latch holder 45 will cause latch pin 51 to move downward. The resilience of the gasket 12, the hatch cover 11 and the rest of the hatch locking structure will provide some resistance to this downward movement. However, after the latch pin passes directly below pivot pin 47, continued rotation produces an upward movement of latch pin 51 which permits hook-shaped catch 35 and locking bar portion 25 to move upward. This in turn permits the hatch cover 11 to move upward and away from the coaming 10. Any pressure directed upward below the hatch cover 11 from the inside of the hopper car will cause the hatch cover 11 to rise and transmit force through the hatch cover mount 29 to the locking arm 14 which will raise the hook-shaped catch 35. The hook-shaped catch 35 will remain engaged with the latch pin 51 and upward force applied on the latch pin 51 will cause latch holder 45 to rotate, until latch pin 51 takes its highest allowable position, the dead point or extended position. At that point, as shown in FIG. 5, the latch pin 51 will be restricted from further movement by the latch holder 45, the links 39 and the latch mounting bracket 37. This will retain the hatch cover 11 at a distance slightly separated from the coaming 10, which will permit pressure in the hopper car to escape between the hatch cover 11 and the coaming 10. Further movement will be restricted by the latching structure 36 in this position. Once the pressure has dissipated, the hatch cover 11 will settle to rest against the coaming 10.

Referring to FIG. 6, to reach the wide open position, the latch pin 51 is passed outward from between the hook-shaped catch 35 and the outer periphery of the hatch cover 11. This is accomplished by the articulation supplied by the two pivots 40 and 47. Once the latch pin 51 has passed between the hook-shaped catch and the outer periphery of the hatch cover 11, the latching structure may be lowered to its wide open position. The lower extremity of the links abut the latch stops 43, allowing the latching structure 36 a rest position without contact with the hopper car upper deck surface 9.

When latching structure 36 is removed from contact with the hook-shaped catch 35, the locking arm 14 and the attached hatch cover 11 may be rotated away from the coaming 10 to a wide open position as shown in FIG. 6. In this wide open position hinge stops 23 mounted on hinge member 15 abut hinge bracket 13 which supports the hatch cover 11 and locking arm 14 in a wide open position without contact with the upper deck surface 9 of the railway car.

For pilferage prevention the latch handle 53 is provided with security seal bores 57 and 58 through which a security seal means 60 may be inserted, as shown in FIG. 2. When the latching structure 36 is placed in the sealed position and the security seal is secured through the bores 57 and 58 and around the locking bar channel portion 25, the latching structure 36 is in a security-locked condition and may not be rotated to unseal or open the hatch cover 11 without removing the security seal means 60.

The use of retaining rings 41 and 49 to secure the latching structure pivot pins 40 and 47 prevents disassembly of the latching structure itself to circumvent the security seal.

The operation of the alternate embodiment shown in FIGS. 8 to 13 is similar to the operation of the embodiment detailed above. The differences in structure in the hinge, the locking bar 25a, and the latch structure are primarily directed to reducing the cost of materials and labor necessary for fabrication of the hatch cover lock arrangement. Most of the components are so designed as to be simply produced from channel stock without a large amount of work. This refers especially to the hinge member 15a, the locking bar 25a, and the latch holder 45a. The use of headed pivot pins 47a extending through bores in latch holder 45a also results in a simpler, easier construction, as does the practice of bolting locking bar 25a directly to latch cover 11.

The tightness of the seal of the hatch cover 11 over the coaming 10 may be adjusted, as best shown in FIGS. 10 and 11.

Cylindrical member 66 extends through circular bore or aperture 64 in latch mounting bracket 37. Pivot pin 40 extends through a bore spaced from the axis of cylindrical member 66. The cylindrical member 66 is secured by set screw 70 which extends through a threaded hole in bracket end wall 37a to abut cylindrical member 66. When set screw 70 is loosened, the cylindrical member 66 may be rotated in the bore 64. The consequence of this rotation is that the distance of the pivot pin 40 from the upper deck surface 9 is altered. This is best shown in FIGS. 10 and 11. In FIG. 10, the pivot pin 40 is vertically positioned at roughly the level of the set screw. In FIG. 11, after adjustment, the pivot pin 40 is positioned somewhat below that. The movement of the pivot pin 40 downward lowers the links 39 downward, which will result in a lower position of the latch holder 45a and the locking bar 25a. This results in an increased downward sealing pressure on the hatch cover 11, gasket 12, and coaming 10.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a hatch cover arrangement for a lading container having a deck means defining a hatch opening, and a hatch cover adapted to cover the hatch opening and pivotally associated with the hatch opening so that the hatch cover is pivotable toward and away from the hatch opening, a latch arrangement comprising:
    a latch engagement structure operatively associated with the hatch cover;
    said latch engagement structure having a first portion operatively associated with the hatch cover and said latch engagement structure having a second portion connected with the first portion and extending generally inwardly and generally toward the center of the hatch opening from the first portion, said second portion having a contact surface portion thereon;
    a latching structure comprising:
    a link means operatively associated with the deck means,
    a latch holder having pivot means connecting with the link means,
    a latch means on the latch holder spaced from the pivot means and engageable with the contact surface portion, whereby the latch holder may be rotated to engage the latch means with the contact surface portion for sealing the hatch cover over the hatch opening and whereby, when the hatch cover is unsealed, excess pressure in the container exerting a force on the hatch cover causes the latch engagement structure to move away from the hatch opening and to rotate the latch holder and latch means into an extended position which retains the hatch cover relatively further from the hatch opening than during sealing closure and allows the excess pressure to escape;
    said latch engagement structure restricting movement of the latch means outwardly of the hatch opening when the latch means is engaged with the contact surface portion whereby the latch means must be moved inwardly of the hatch opening to disengage the latch structure from the latch engagement structure thereby preventing unlatching of the hatch cover by blows from an operator.

2. The invention according to claim 1, and
said first and second portions of the latch engagement structure forming a generally hook-shaped catch engageable with the latch means.

3. The invention according to claim 2, and
the catch and the outer periphery of the hatch cover defining a gap therebetween through which the latch means is passed for uncoupling the latch means from the catch.

4. The invention according to claim 1, and
the latch means comprising a pin.

5. The invention according to claim 4, and
the latch holder including two side plate portions between which the latch means is supported.

6. The invention according to claim 1, and
a handle attached to the latch holder whereby operator use is facilitated.

7. The invention according to claim 6, and
the latch engagement structure being mounted on a locking arm extending above and across the hatch cover,
the locking arm having a stop surface thereon,
the handle being adapted to abut the stop surface when the latch arrangement retains the hatch cover over the hatch opening in sealing engagement and the handle having two security bores therein and
security means adapted to extend through the security bores and around the locking arm whereby the hatch cover arrangement is placed in a security-locked condition and rotation of the latch holder and handle to unseal the hatch cover requires removal of the security means.

8. The invention according to claim 7, and
a latch structure bracket fixedly associated with the deck means, and
a pivot structure connecting the link means with the latch structure bracket,
retaining ring means securing the pivot means and the pivot structure in assembled condition thereby rendering the security-locked condition more difficult to circumvent by disassembly of the latch structure.

9. The invention according to claim 1, and
a latch bracket means fixedly associated with the deck means, and
the link means being pivotally connected with the latch bracket means.

10. The invention according to claim 9, and
stop means attached to the latch bracket means and adapted to engage the link means when the latch structure is rotated away from the latch engagement structure, thereby supporting the link means away from the deck means.

11. The invention according to claim 1, and
the line means having a pivotal connection with the deck means to provide for complete disengagement of the latching structure from the latch engagement structure.

12. The invention according to claim 1, and
the latch holder having rotation limiting means thereon, the rotation limiting means being adapted to stop rotation of the latch holder and latch means at a point beyond the fully contracted position of the link means, the latch holder, and the latch means, whereby the link means, the latch holder, the latch means and the latch engagement structure coact to operate as an over-center lock for the hatch cover arrangement.

13. A hatch cover arrangement for a lading container having a deck means and a hatch opening in said deck means, the hatch cover arrangement comprising:
a hatch cover adapted to cover the hatch opening;
a hinge structure fixedly associated with the deck means operatively associated with the hatch cover to provide hinged movement thereof with respect to said hatch opening;
a hook-shaped latch engagement member operatively associated with the hatch cover;
said hook shaped latch engagement member comprising a mounting portion operatively associated with the hatch cover, a first portion connected with the mounting portion and extending generally downwardly therefrom, and a second portion connected with the first portion and extending generally laterally therefrom substantially below said mounting portion;
said second portion having a contact surface portion thereon and the contact surface portion and the mounting portion defining a space therebetween;
a latch mounting bracket fixedly associated with the deck means;
link means pivotally connected with the latch mounting bracket;
a latch holder having pivot means connecting with the link means;
a latch member on the latch holder spaced from the pivot means and adapted to engage with the contact surface portion whereby the latch holder may be rotated to seal the hatch cover over the hatch opening and whereby when the latch holder is rotated, unsealing pressure in the lading container will cause the latch engagement member to rise and to rotate the latch holder and latch member into an extended position, retaining the hatch cover and allowing the pressure in the lading container to escape.

14. The invention according to claim 13, and the hinge structure comprising:
a bracket means rigidly connected with the upper deck surface,
a hinge member pivotally connected with the bracket means,
a locking arm connected with the hinge member and connected with the hatch cover,
the hinge member having stop means affixed thereto, the stop means being adapted to abut the bracket means when the hatch cover is pivoted to a wide-open position thereby supporting the hatch cover without contact with the upper deck surface of the lading container,
the hinge member comprising a channel shaped member including a pair of spaced walls defining a space therebetween, and
the stop means being affixed to the walls and within said space to provide an internal hinge stop arrangement.

15. The invention according to claim 14, and
the locking arm comprising a linearly straight channel member having a generally U-shaped cross section.

16. The invention according to claim 14, and
the stop means comprising a bar member extending between the walls and connected thereto.

17. A hatch cover arrangement for a lading container having a deck means and a hatch opening in said deck means, the hatch cover arrangement comprising:
a hatch cover adapted to cover the hatch opening;
a locking arm connected with the hatch cover and extending thereabove;
a hinge structure fixedly associated with the deck means and operatively associated with the hatch cover to provide hinged movement thereof with respect to said hatch opening;
a hook-shaped latch engagement member on the locking arm;
said hook shaped latch engagement member comprising a mounting portion connected with the locking arm, a first portion connected with the mounting portion and extending generally downwardly therefrom, and a second portion connected with the first portion and extending generally laterally therefrom substantially below said mounting portion;
said second portion having a contact surface portion thereon and the contact surface portion and the mounting portion defining a space therebetween;
a latch mounting bracket fixedly associated with the deck means;
link means pivotally connected with the latched mounting bracket;
a latch holder having pivot means connecting with the link means;
a latch member on the latch holder spaced from the pivot means and adapted to engage with the contact surface portion, whereby the latch holder may be rotated to seal the hatch cover over the hatch opening and whereby when the latch holder is rotated unsealing pressure in the lading container will causes the latch engagement member to rise and to rotate the latch holder and latch member into an extended position, retaining the hatch cover and allowing the pressure in the lading container to escape.

18. The invention according to claim 17, and
a handle attached to the latch holder to facilitate operator use.

19. The invention according to claim 17, and
a hinge structure comprising:
a hinge bracket fixedly associated with the deck means of the lading container,
a hinge member attached to the locking arm and pivotally connected with the hinge bracket, and
stop means on the hinge member and adapted to engage the hinge bracket when the cover is rotated away from the hatch opening, thereby supporting the hatch cover arrangement in the wide-open position.

20. In a lading container having a deck means defining a hatch opening, a hatch cover arrangement comprising:

a hatch cover adapted to cover the hatch opening and to act on an associated sealing means around the hatch opening, the hatch cover being pivotable toward and away from the hatch opening;

a latch engagement structure connected with the hatch cover;

a latch structure connected with the deck means and adapted to engage with the latch engagement structure for securing the hatch cover over the hatch opening, the latch structure including a bracket member fixedly connected with the deck means and having an aperture therein;

an adjustment member supported in the aperture in the bracket member and rotatable therein;

locking means selectively allowing rotation of the adjustment member in the aperture and selectively securing the adjustment member against rotation in the aperture in one of a plurality of rotated positions, pivot means supported by the adjustment member and spaced from the axis of rotation of the adjustment member in the aperture, whereby rotation of the adjustment member adjusts the distance of the pivot means from the deck means, and a latch arrangement operatively associated with the pivot means and adapted to be engageable with the latch engagement portion whereby rotation of the adjustment member adjusts the tightness of the closure of the hatch cover over the hatch opening.

21. The invention according to claim 20, and the bracket member having an opening therein, and the locking means comprising fastening means supported in the opening in the bracket member and engageable with the adjustment member, whereby the adjustment member may be selectively allowed rotation for adjustment and secured against rotation in the aperture.

22. A hatch cover arrangement for a lading container comprising:

a deck means defining a hatch opening in the lading container, a hatch cover adapted to cover the hatch opening, a hinge structure fixedly associated with the deck means, a locking bar member extending above and across the hatch cover and being operatively associated with the hinge structure for hinged movement with respect to the deck means, a hook shaped latch engagement structure supported on the locking bar member;

said hook shaped latch engagement member comprising a mounting portion connected with the locking arm, a first portion connected with the mounting portion and extending generally downwardly therefrom, and a second portion connected with the first portion and extending generally inwardly of the hatch opening and generally laterally and below said mounting portion from said first portion generally below said mounting portion;

said second portion having a contact surface portion thereon;

a latching structure connected with the deck means and having a latch member engaging the contact surface portion for retaining the hatch cover in a sealed position over the hatch opening and in a pressure release position spaced from the hatch opening, said hook shaped latch engagement member prevention outward movement of the latch member with respect thereto in the sealed position, thereby preventing unsealing of the hatch cover by blows from an operator.

23. The invention according to claim 22, and the locking bar member comprising a linearly straight channel member.

* * * * *